Figure 1:
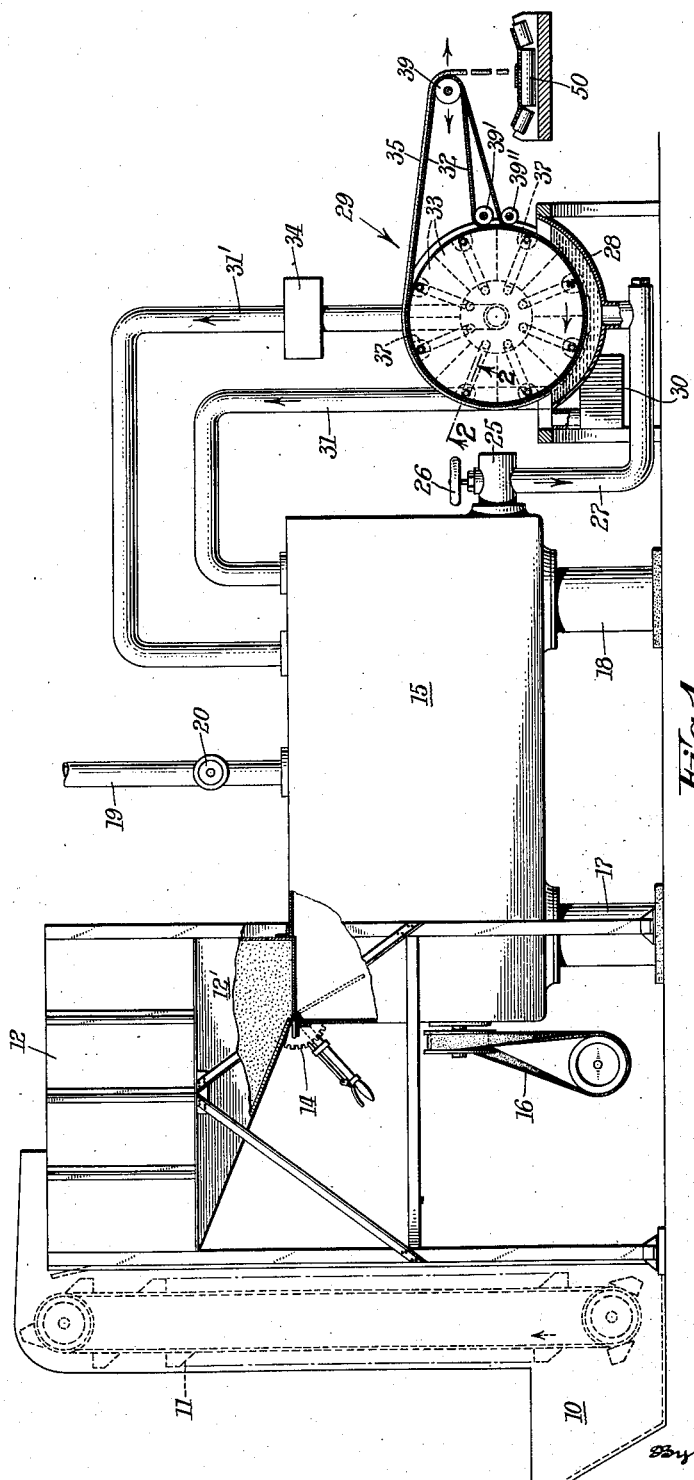

Aug. 8, 1950     D. MILLER ET AL     2,518,046
MANUFACTURE OF LIME PUTTY
Filed Feb. 11, 1949

Inventors:
Durando Miller
Thomas R. Komline
By
John Meander
Agent

Patented Aug. 8, 1950

2,518,046

UNITED STATES PATENT OFFICE 2,518,046

MANUFACTURE OF LIME PUTTY

Durando Miller, Pelham, N. Y., and Thomas R. Komline, Ridgewood, N. J.

Application February 11, 1949, Serial No. 75,946

7 Claims. (Cl. 23—188)

This invention relates to improvements in methods and equipment for the production of lime-putty. The invention is principally directed to the treatment of commercial quicklime to provide a partially de-watered lime-putty having commercially satisfactory plasticity and sand carrying capacity, and one which, when troweled as mortar or plaster, will finish smoothly and bond securely to the surface to which it is applied.

Calcium limes and magnesium limes, varying in percentage quantity of calcium oxide, magnesium oxide and impurities, are well known quicklimes used in the production of lime-putty which may be obtained in one of several forms; as lump lime, or as granular lime, or as pulverized lime. In known processes of making ready-mixed lime-putty, quicklime is slaked with water and aged and, during the aging cycle, slowly drained of excess water to a degree whereby it may be satisfactorily carried in a hod or otherwise transported to the location at which it is to be used. For white-coat plaster the lime putty is used essentially in the form produced after slaking, aging and dewatering. If mortar is desired, the putty is mixed with sand or with sand and cement, depending upon requirements.

To prepare a good mortar putty, the minimum slaking and aging period, in the case of high calcium limes, has been considered to be approximately from one to seven days, during which time substantially complete hydration will take place, calcium oxide being transformed to calcium hydroxide and magnesium oxide to its corresponding hydroxide. In the reaction effected by intimate contact of water and quicklime, the heat generated aids in the formation of a colloidal structure and hence tends to produce a more plastic final product which trowels easily and leaves a good finish. For white coate plaster, aging the product for several weeks after slaking has been considered essential to insure a consistently good material, although the precise reactions in the slaking and aging processes for quicklime are not fully understood.

Present techniques in the commercial preparation of ready mixed mortar and plaster include first, the feeding of water and quicklime into a slaking tank equipped with means for agitating the mixture, and with a recording thermometer enabling the operator to maintain the optimum slaking temperature within desired limits to avoid burning or drowning the lime. The slaked lime is then pumped or allowed to flow from the slaking tank to an aging and drainage tank where the material cools and excess water is permitted to drain off to a point where the moisture content is approximately 50%. The aging and draining operation may be performed either in large horizontal tanks or vats, where drainage may require a period of not less than three weeks, or in vertical tanks of the type known in the trade as Brooks-Taylor tanks constructed in accordance with U. S. Patent 1,810,025. In the Brooks-Taylor tanks, dewatering takes place at a faster rate than in the large horizontal tanks and reduces the required time by from one to two weeks depending upon the type of lime and the slaking procedure employed.

A disadvantage of known commercial procedures, which comes about by reason of the long cooling and dewatering cycle, resides in the extremely awkward requirement for maintaining a continuous supply of slaked lime in various stages of dewatering consistent with the normal demand for material. Any unusually large demand for lime-putty must be anticipated weeks in advance of delivery and, likewise, a reduction in the demand must also be balanced ahead of time to avoid excessive dewatering which may otherwise result in an inferior product. Usual methods of hastening the drying of materials, as by the application of heat or of heat and vacuum, if applied to reduce the period of dewatering lime-putty, would destroy the plasticity of the putty and other desired properties and therefore cannot be used.

We have discovered that extensive periods of aging and dewatering may be avoided, and that lime-putty production may be reduced to a matter of hours rather than of days and weeks. Quicklime may be slaked in the same manner as theretofore described by mixing granular, lump, or pulverized lime with water in slaking tanks to produce milk of lime in a highly liquid state, the liquid content being 75%–80% and the balance solids, and the temperature about 180° F. Instead of then pumping the milk of lime to a drainage tank, a rotary drum vacuum filter of special characteristics is utilized to both cool and dewater the lime-putty from the mixture and to deliver the finished product as desired. The ability to cool and satisfactorily dewater the milk of lime continuously and rapidly without loss of the advantageous structure of the hydrates is peculiar to the style of drum filter and to the filter element used, and the product of this operation has proved to be even better in some respects than that which was formerly obtained in the extended process of slow drainage. As a result, and with the process and equipment of our invention, it is now possible to produce lime-putty on scheduled operation without the losses and inconveniences caused by an extensive manufacturing time cycle.

With these factors in mind, it is the principal object of our invention to provide a process for producing lime-putty of high plasticity and good bonding and sand carrying characteristics in the shortest possible period of time. A further and important object of the invention is to provide equipment which eliminates the extensive facilities needed for storage of large quantities of material in process of cooling and aging in the manufacture of lime-putty. A still further object of our invention is to effect a process for producing lime-putty at a high rate of production with machinery and equipment capable of day in, day out performance at low cost.

Figure 3:
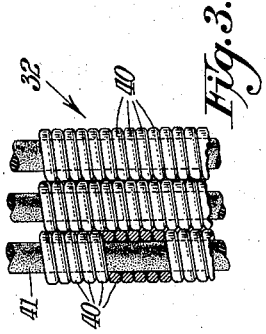
Figure 2:
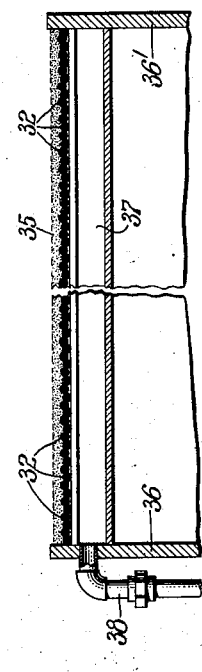

These objects and other important considerations will be more fully understood by reference to the following detailed specification describing a preferred physical embodiment of the apparatus with which our improved process is performed, and taken in conjunction with the annexed drawing in which:

Figure 1 is a diagrammatic view illustrating one form of apparatus employed in the practice of our improved lime-putty production method, Figure 2 is a fragmentary cross-sectional view of a peripheral portion of a vacuum filter which performs an important operation in the method of our invention taken on line 2—2 of Figure 1, and Figure 3 is a plan view showing a small section of the filter medium used in the above vacuum filter.

Referring to Figure 1, quicklime shipped in water tight containers or paper bags from the source of supply may conveniently be carried by truck to the lime-putty plant and discharged into the boot 10 of a bucket elevator 11 by which it is carried upwardly to an elevated lime-storage bin 12. Storage bin 12 is a large water tight enclosure having an inclined, lower discharge portion 12', the sides of which converge to dump the lime by gravity through a gate 14 to a horizontal open slaking tank 15 supported on a pair of end pedestals 17, 18 and fitted with suitable agitating mechanism actuated by a drive 16. Water supply for the admixing operation is led into the tank from the top through a pipe-line 19 and the water supply may be regulated by means of a valve 20 in the line.

The slaking reaction is preferably carried out using proportions of approximately 75% water and 25% lime solids by weight. This operation is well known to those skilled in the art of lime-putty manufacture and, in accordance with customary procedure, a recording thermometer (not shown) may be installed in the tank to regulate the temperature of the milk of lime during the slaking operation so that it will not rise to a temperature that would be injurious to the lime and yet so that it will be maintained at the highest practical reading in order for adequate formation of the colloidal characteristics which are important for ultimate plasticity in the final product.

At the lower right hand end of tank 15 is a slaked lime outlet 25 controlled by means of a valve 26 to permit withdrawal of slaked lime and water through pipe line 27 from the tank to the supply pan 28 of a rotary vacuum drum filter 29 of special characteristics to be hereinafter described. As is customary with drum filters of this general description, supply pan 28 lies directly beneath the filter drum which is, in turn, trunnioned for slow rotation in the direction of the arrow under the influence of a drive motor (not shown) while partially submerged in the material to be dewatered. An overflow at the left hand side of tank 28 re-directs surplus milk of lime to a pump 30, which will discharge through pipe line 31 back to the slaking tank 16 in order that there will be no loss of material.

Suitable auxiliary appurtenances which are desirable or necessary for safety and for the proper functioning of apparatus hereinbefore described may be added, as will be fully understood by those who are skilled in lime-putty production. For example, during dewatering operations which will hereinafter be described in detail, certain automatic control equipment may be utilized for control of valve 26 in order to maintain an optimum level of milk of lime in pan 28 and to initiate operation of the overflow pump 30 when there is a surplus flow to pan 28. Still further possibilities exist in using a plurality of slaking tanks and a plurality of filter units which may be co-ordinately interconnected and, while the diagram is illustrative of single units, it is not intended that this showing shall convey a limitation in this respect since it is within the ability of persons skilled in this art to arrange the units in multiple for performing the process according to the demand and the desired flow of operation.

The drum of vacuum filter 29 is divided into equal segmental areas 33 for distribution of vacuum, as will be hereinafter more fully explained, and a travelling filter web 32 composed of parallel contiguous filaments encompasses the greater portion of the periphery of the drum while being trained away from the drum in the upper right hand quadrant for purposes of cooling and discharge. Vacuum, originating in the wet vacuum pump 34, is applied under web 32 to specific segmental drum areas 33 whereupon effluent is drawn through the filter element and back to tank 15 in a return line 31', leaving a layer of partially dewatered solids 35 on the outside surface of the filter element. Figure 2 shows a fragmentary section of the drum with web element 32 resting thereon between drum heads 36, 36' over which is the layer of dewatered solids or lime-putty 35. Directly below the surface of the drum in each segmental area is a drainage and vacuum channel 37 extending the full length of the drum which interconnects with a radial vacuum line 38 leading to a suitable vacuum valve (not shown) for control and distribution of vacuum to the desired segmental areas during drum rotation.

The vacuum valve is arranged in accordance with usual drum filter practice to cut-in vacuum only at segmental areas on the drum which are either submerged in the milk of lime or are on the rising side of the drum. In this manner, the solids will accumulate on that portion of filter element immersed in pan 28 during rotation of the drum and will be held to the drum to rotate therewith and to cool and receive further dewatering until the topmost drum position is reached. At this point vacuum is cut-off so that the filter element may leave the drum with the solids carried thereby to be transported away and discharged to conveyor 50 as element 32 passes over and reverses direction at the remotely situated discharge roller 39. From this roller the filter filaments are trained back and separated over guide rollers 39', 39" to be suitably washed and reassembled to again complete the filter element 32 before they again become submerged in the pan 28.

I prefer to use filtration filaments to make up web element 32 which are constructed according to the detail of Figure 3, each filament comprising principally a helically wound endless metal spring 40 or the like which is impervious to attack by milk of lime. Stainless steel has been found to be satisfactory for this purpose, each filament spring having a ground outside diameter of .430", with successive coils of the spring in close contact. The space within the interior of springs 40 is filled with a flexible, impervious filler 41 of neoprene or the like which will prevent flow of effluent longitudinally along the filament during the filtration procedure. As shown in Figure 2, the filaments are laid in a staggered formation whereby they will abut closely against each other to prevent the flow of effluent between their contacting surfaces. During filter operation, the liquid flow takes place circumferentially of the filaments in the interstices between successive coils of the spring, hence requiring a slight stretch to produce the desired coil separation. To some extent this separation is obtained by training the filaments over the cylindrical drum surface whereby the coils will be spread apart at the outside radius and closed at the inside radius resting on the drum, although further stretching may be produced by adjusting the discharge roller 39 horizontally away from the drum. The staggered formation of the filaments also assists in permitting them to be readily separated from one another as an upper and lower layer for washing on the return to the drum from discharge roller 39. Discharge of the lime-putty will, depending upon the friability of cake 35, take place merely by the reversal of direction of the filter element, however, if it is necessary to additionally strip less friable putty from the filter element, a series of tines or a suitably notched doctor blade may be added for this purpose.

We have found that this filtering action, which is carried on for a very short period of time, substitutes for the extensive cooling and aging heretofore relied upon to change the material from milk of lime to lime-putty in a hodable condition and produces a lime-putty having equal or superior colloidal characteristics to any putty produced by presently accepted methods. We believe that the excellence in result is, in part, due to the extended cooling on the filaments in a thin layer and without mechanical disturbance. The metallic filter elements, in addition to serving as a completely satisfactory, non-deteriorating, medium, also serve to enhance the rate of change from the milk of lime to the stiffer gel structure by the ability to rapidly transfer heat away from the material during the vacuum cycle and transporation cycle which follows. Lime-putty from the filter may be used immediately for mixing with sand in a mortar mixer and may be conveyed directly thereto by the conveyor or, if desired to suitable storage facilities for immediate use as white-coat plaster. If further aging is desired for premium quality plaster, it may be discharged from the conveyor to boxes or tanks used for this purpose.

The invention may be employed with high calcium limes or with high magnesium limes, or with other usual commercial quick-limes. Those skilled in this art will recognize that various obvious changes may be substituted for the procedures and equipment hereinbefore described as a preferred embodiment of the invention, and it is not intended that the invention be limited thereby other than as particularly pointed out in the appended claims.

We claim:

1. In the production of lime-putty, wherein quick-lime is initially slaked to provide milk of lime, the improvement which includes the combined steps of partially dewatering the milk of lime immediately after slaking by vacuum filtration on a filter medium in a continuous rotary drum filter, then conveying the dewatered material on the filter medium as a uniform cake away from the filter drum through a conditioning cycle, and finally discharging the resulting lime-putty from the filter medium as an irregular, putty-like mass.

2. In the production of lime-putty, wherein quick-lime is initially slaked to provide milk of lime, the improvement which includes the combined steps of partially dewatering the milk of lime immediately after slaking by vacuum filtration on a metallic filter medium in a continuous rotary drum filter, then conveying the dewatered material on the filter medium as a uniform cake away from the filter drum through a conditioning cycle, and finally discharging the resulting lime-putty from the filter medium as an irregular putty-like mass.

3. In the production of lime-putty, wherein quick-lime is initially slaked with water to provide milk of lime, the improvement which includes the combined steps of partially dewatering and partially cooling the milk of lime immediately after slaking by vacuum filtration on a coiled metallic spring filter medium in a continuous rotary drum filter, conveying the dewatered material on the filter medium as a uniform cake away from the filter drum through a further cooling and conditioning cycle, and finally discharging the resulting lime-putty from the filter medium as an irregular, putty-like mass.

4. In the production of lime-putty, wherein quick-lime is intially slaked with water in the weight proportion of approximately 75% water to 25% solids to provide milk of lime, the improvement which includes the combined steps of partly dewatering the milk of lime immediately following slaking on a metallic filter medium in a continuous rotary vacuum filter to a putty of approximately equal proportions by weight of solids and water, then conveying the material away from the filter as a uniform cake of lime-putty on the filter medium through a cooling and conditioning cycle on the filter medium and finally discharging the lime-putty from the filter medium as an irregular, putty-like mass.

5. A method for producing lime-putty which includes the steps of dewatering milk of lime immediately after slaking in a drum filter by vacuum filtration on a filter medium comprising a series of flexible contiguous coil spring elements disposed to travel in free space away from the filter between points of support, then conveying the dewatered material through a conditioning cycle on the filtering medium while the medium is traveling in the open between points of support.

6. In the production of lime putty, the improvement in the art of treating slaked lime which includes the steps of dewatering the lime to a uniform cake immediately after slaking on a moving filter medium superposed on a vacuum filter drum, then cooling and conditioning the dewatered cake by transposition on the filter medium away from the filter drum in free space.

7. In the production of lime putty, the improvement in the art of treating slaked lime which includes the steps of dewatering the lime to a uniform cake immediately after slaking on a moving metallic filter medium superposed on a vacuum filter drum, then cooling and conditioning the dewatered cake by transposition on the metallic filter medium away from the filter drum in free space.

DURANDO MILLER.
THOMAS R. KOMLINE.

REFERENCES CITED

The following references are of record in the file of this patent:

UNITED STATES PATENTS

| Number | Name | Date |
|---|---|---|
| 803,904 | Jones | Nov. 7, 1905 |
| 956,977 | Kemler | May 3, 1910 |
| 1,511,446 | Doyle | Oct. 14, 1924 |
| 2,426,886 | Komline | Sept. 2, 1947 |
| 2,462,604 | Boucher | Feb. 22, 1949 |